(No Model.)
J. H. HOBART.
PIPE COUPLING.
No. 315,287. Patented Apr. 7, 1885.
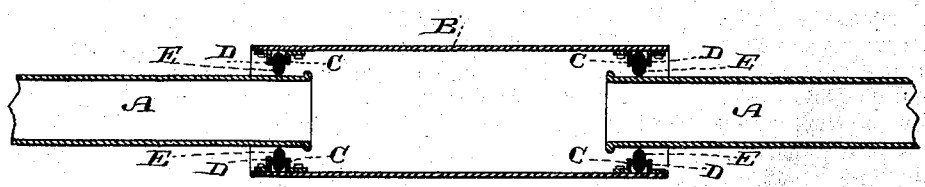
Witnesses,
Geo H Strong.
J. H. Trunke.
Inventor,
John H Hobart
By Dewey & Co
Attorneys

United States Patent Office.

JOHN H. HOBART, OF OAKLAND, ASSIGNOR TO THOMAS H. WILLIAMS AND DAVID BIXLER, OF SAN FRANCISCO, CALIFORNIA.

PIPE-COUPLING.

SPECIFICATION forming part of Letters Patent No. 315,287, dated April 7, 1885.

Application filed December 29, 1884. (No model.)

*To all whom it may concern:*

Be it known that I, JOHN H. HOBART, of Oakland, Alameda county, State of California, have invented an Improvement in a Sleeve-Coupling and Joint for Pipes; and I hereby declare the following to be a full, clear, and exact description of the same.

My invention relates to a novel coupling for pipes, by the use of which the length may be varied, and at the same time the direction of the pipe may be changed.

It consists of two lengths of pipe the ends of which approach nearly to each other, an exterior sleeve of larger diameter having flexible annular packing-rings at each end, through which the first-named pipes pass, and within which they may move and turn without causing leakage.

Referring to the accompanying drawing for a more complete explanation of my invention, the figure is a longitudinal section of the joint.

A A are the ends of two sections of pipe which it is desired to unite, so that they may, if desired, have more end-play, and at the same time may have their direction changed with relation to each other.

B is a section of pipe of considerably larger diameter, and of a length sufficient so that it extends beyond the adjacent ends of the pipes A. Within this pipe near each end is riveted an annular flange, C, of angle-iron, and D are similar flanges of angle-iron fitted to the outer ends of the pipe B, so that they may be bolted in their places. Between the flanges are fixed the packing-rings E, which may be made of hemp rope, rubber tubing, or any other suitable flexible material. The flanges C being permanently fixed in their places, the pipe B is slipped over the ends of the pipes A, so that they both enter it beyond the flanges C. The packing is then placed against the flanges C, and the exterior flanges, D, are bolted into the tube inside of the packing, thus holding it in place. This joint is especially applicable to large pipes, which are used in carrying dredged material ashore, and in which it is often necessary to change the direction considerably. In the present case the pipes A A are represented as being eighteen inches in diameter, and the sleeve-section B twenty-two inches in diameter, thus leaving a space of two inches between it and the pipes A to receive the flexible packing-rings E. This allows the pipes A to be turned within the sleeve B, so that an angle of thirty-five or forty degrees may be obtained without causing any leakage, at the same time a slight end motion or adjustment of the pipes A A may be made relative to each other.

Having thus described my invention, what I claim as new, and desire to secure by Letters Patent, is—

In a joint or coupling for pipes, the sleeve B, provided with angle-irons C and D, in combination with the packing-rings E, secured between the irons, and the sections A, having a diameter smaller than the sleeve, substantially as described.

In witness whereof I have hereunto set my hand.

J. H. HOBART.

Witnesses:
S. H. NOURSE,
H. C. LEE.